(12) United States Patent
Motegi et al.

(10) Patent No.: US 8,130,740 B2
(45) Date of Patent: *Mar. 6, 2012

(54) APPARATUS AND METHOD FOR CHANNEL TRANSMISSION

(75) Inventors: Masayuki Motegi, Yokohama (JP); Yasuhiro Kato, Yokohama (JP); Anil Umesh, Yokohama (JP); Takehiro Nakamura, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 790 days.

This patent is subject to a terminal disclaimer.

(21) Appl. No.: 11/917,809

(22) PCT Filed: Jun. 16, 2006

(86) PCT No.: PCT/JP2006/312176

§ 371 (c)(1),
(2), (4) Date: Nov. 3, 2008

(87) PCT Pub. No.: WO2006/135064

PCT Pub. Date: Dec. 21, 2006

(65) Prior Publication Data

US 2009/0219906 A1   Sep. 3, 2009

(30) Foreign Application Priority Data

Jun. 17, 2005   (JP) ................................. 2005-178531

(51) Int. Cl.
 *H04B 7/216*   (2006.01)
(52) U.S. Cl. ....................................... 370/342; 455/447
(58) Field of Classification Search .................. 370/342, 370/441; 455/447

See application file for complete search history.

(56) References Cited

U.S. PATENT DOCUMENTS

| 6,108,550 | A | * | 8/2000 | Wiorek et al. ................ 455/447 |
| 6,385,457 | B1 | | 5/2002 | Dam et al. |
| 6,738,634 | B1 | | 5/2004 | Shin |
| 6,901,065 | B1 | | 5/2005 | Ehrstedt et al. |
| 6,907,248 | B2 | * | 6/2005 | Lee et al. ....................... 455/450 |
| 7,580,388 | B2 | * | 8/2009 | Kim .............................. 370/329 |
| 2009/0088173 | A1 | * | 4/2009 | Motegi et al. ................. 455/450 |

FOREIGN PATENT DOCUMENTS

| CN | 1267437 | 9/2000 |
| CN | 1269953 | 10/2000 |
| CN | 2676543 | 2/2005 |
| EP | 0 681 406 A1 | 11/1995 |

(Continued)

OTHER PUBLICATIONS

International Search Report for PCT/JP2006/312176 mailed Aug. 15, 2006, 1 page.

(Continued)

*Primary Examiner* — Phuc Tran
(74) *Attorney, Agent, or Firm* — Osha • Liang LLP

(57) ABSTRACT

A radio physical channel is available to multiple logical channels commonly, and multiple radio physical control channels are provided concomitantly with the radio physical channel and include a commonly usable common control channel. A channel transmission apparatus includes a logical channel type determination unit determining a type of a logical channel, and a channel transmission unit transmitting an identifier of the UE in the radio physical control channel depending on the type of the logical channel. A scheme of identifying the UE in the radio physical control channel is modified depending on the type of the logical channel.

7 Claims, 15 Drawing Sheets

FOREIGN PATENT DOCUMENTS

| | | |
|---|---|---|
| JP | 2002-506582 | 2/2002 |
| TW | 502519 | 9/2002 |
| TW | M240063 | 8/2004 |
| WO | 02/03600 A1 | 1/2002 |
| WO | 2004/013978 | 2/2004 |

OTHER PUBLICATIONS

Written Opinion of International Searching Authority mailed Aug. 15, 2006, 3 pages.

Taiwanese Office Action for Taiwanese Application No. 95121659, mailed on Apr. 17, 2009 (13 pages).

esp@cenet patent abstract for Taiwanese Publication No. 502519, Publication date Sep. 11, 2002 (1 page).

esp@cenet patent abstract for Chinese Publication No. 2676543, Publication date Feb. 2, 2005 (1 page).

Keiji Tachikawa, "W-CDMA Mobile Communications System", published by Maruzen K.K., pp. 103-157, Jun. 25, 2001 (Japanese reference with English translation).

Office Action in Chinese Application No. 200680025379.5, dated Sep. 13, 2010, with English translation thereof (10 pages).

espacenet abstract of Chinese Publication No. CN 1267437, Publication date Sep. 20, 2000 (1 page).

espacenet abstract of Chinese Publication No. CN 1269953, Publication date Oct. 11, 2000 (1 page).

* cited by examiner

APPARATUS AND METHOD FOR CHANNEL TRANSMISSION

TECHNICAL FIELD

The present invention relates to a method of transmitting a logical channel over a single radio physical channel, and more particularly to some techniques of transmitting a logical channel prior to establishment of a connection.

BACKGROUND ART

In a radio communication system in compliance with the W-CDMA (Wideband-Code Division Multiple Access) scheme, various correspondences among a channel, a connection sequence and a radio physical channel are defined as described in non-patent document 1. As the correspondence between channels, three types of channels are defined as follows. First, a logical channel serves as a functional channel defined between an RLC and a MAC. Second, a transport channel serves as a functional channel defined between a MAC layer and a physical layer. Third, a physical channel serves as a functional channel in a physical layer. The logical channel has correspondence with the transport channel, and the transport channel has correspondence with the physical channel.

In a mobile communication system in compliance with the W-CDMA scheme, multiple logical channels are arranged (mapped) on multiple radio physical channels via multiple transport channels. FIG. 1 shows a conventional channel correspondence.

As illustrated in FIG. 2, on the other hand, user equipment (UE) is identified through an identifier (TMSI) in L3 (RRC) for a connection sequence prior to establishment of a RRC connection. Thus, since there is no individual correspondence with L2 until the RRC connection is established, a logical channel is transmitted in the CCCH. Also, since the UE is identified through the identifier in L2 (C- or H-RNTI) after establishment of the RRC connection, there is an individual correspondence in the L2 level, and the logical channel is modified to DCCH.

Specifically, a "RRC connection request" being a control signal at the establishment of the RRC connection is transmitted in the CCCH, and the radio physical channel is a PRACH (RACH). In addition, a "RRC connection setup" is transmitted in the CCCH, and the radio physical channel is a SCCPCH (FACH). Since the RRC connection has been established, in subsequent communications (signaling), the logical channel is transmitted in the DCCH and the radio physical channel is transmitted in the DPCH (DCCH). At the establishment of the RRC connection, the SDCCH is provided as a transmission path, and no channel is provided for transmission of U-plane.

In this fashion, a radio channel is modified by RRC signaling at the setup of the RRC connection (at the establishment of the RRC connection). A radio physical channel is set up for the U-plane transmission in a radio bearer setup. In other words, a channel is added by RRC signaling.

Also, the uplink access scheme uses a preamble prior to establishment of a dedicated channel. The preamble is 4,096 in chip length resulting from 256 repetitions of a 16 chip signature and is ramped in use. At receipt of the preamble, a base station (BTS) uses the AICH to return Acknowledgement (Ack) or Non-acknowledgement (Nack). In the case of Ack, data are transmitted over the PRACH after a predefined number of slots (conventionally three or four slots) in a system. The preamble includes no traffic information.

In the HSDPA (High Speed Downlink Packet Access) scheme, a shared channel (HS-PDSCH) for use between UEs is provided. In this channel, the logical channel such as DCCH or DTCH after the establishment of the RRC connection is transmitted. Concomitantly with HS-PDSCH, the HS-SCCH is provided to serve as a common control CH to report that data have arrived in the HS-PDSCH. In the HS-SCCH, UE recognizes based on data masked by the identifier for L2 that data destined for itself have arrived. Also, although each UE is capable of receiving the HS-SCCH up to four codes, HS-SCCH codes for use in the associated cell are reported to the UE by RRC signaling. The codes are included in radio bearer setup/reconfiguration. In HS-PDSCH, some techniques of HARQ and AMC are used.

For an enhanced uplink, since scheduling is carried out in a base station (Node B), a channel (E-DPCCH) for transmitting a reservation signal to transmit data to the base station (Node B) and a channel (E-RGCH, E-AGCH) for transmitting a reservation acknowledgement are defined. Furthermore, a channel (E-DPDCH) for transmitting uplink data is defined. In the E-DPDCH, HARQ is implemented similar to HS-PDSCH.

Non-patent document 1: "W-CDMA Mobile Communication Scheme (in Japanese)" edited by Keiji Tachikawa, pp. 103-157.

DISCLOSURE OF INVENTION

Problem to be Solved by the Invention

In prior art, a channel hierarchy consists of three layers, a logical channel, a transport channel and a physical channel. The logical channel is associated with the transport channel, and the transport channel is associated with the physical channel. Multiple logical channels are assigned to multiple radio physical channels via the transport channel. Basically, the radio physical channel is determined depending on characteristics of the logical channel. For example, the CCCH is transmitted in the RACH or SCCPCH, and the DCCH or DTCH is transmitted in the DPCH or HS-PDSCH.

Considering a connection sequence, for CCCH (Logical channel) signaling in the course of establishment of a RRC connection, the uplink is transmitted in the PRACH, and by return the downlink is transmitted in the SCCPCH. Also, for the signaling after the establishment of the RRC connection, the DCCH is transmitted in the DPCH. In this fashion, in accordance with W-CDMA, the radio physical channel is specified depending on the characteristics of the logical channel, and the radio physical channel is modified by the RRC signaling. For this reason, a procedure or a message is required to modify the radio physical channel. In addition, there are some problems such as increased protocol statuses for channel transition, control delay and data loss. Furthermore, in W-CDMA, since a logical channel (bearer) is additionally provided for transmission of U-plane after the signaling, signaling for L3 must be also used there.

While UE is identified by the identifier for L3 prior to the establishment of the RRC connection, UE is identified by signaling for L2 in the radio physical control channel concomitant with the current shared channel. That is, different identification methods are used.

Also, only the HS-DSCH (transport channel) can be mapped to the HS-PDSCH (physical channel), and thus the other transport channels (e.g, PCH, BCH) cannot be mapped to it. Then, only the DCCH and DTCH can be arranged (mapped) to the HS-DSCH, and the other logical channels cannot be mapped to it because of difficulty of UE identification in the L2 level.

One object of the present invention is to provide a channel transmission apparatus and a channel transmission method for efficiently transmitting the CCCH in a radio physical channel (shared channel) for use in the course of establishment of a RRC connection in a channel transmission system where the transmission scheme is sequentially modified depending on characteristics of a logical channel in the case of transmission of multiple functional channels (logical channels) in a common radio physical channel.

Means for Solving the Problem

In an embodiment of the present invention, a channel transmission apparatus for communicating to user equipment (UE) within a radio access network (RAN) is used. In this apparatus, a radio physical channel is available for multiple logical channels commonly, and multiple radio physical control channels are provided concomitantly with the radio physical channel and include a commonly usable common control channel. The channel transmission apparatus includes a logical channel type determination unit determining type of a logical channel, and a channel transmission unit transmitting an identifier of the UE in the radio physical control channel depending on the type of the logical channel. A scheme of identifying the UE in the radio physical control channel is modified depending on the type of the logical channel.

Advantage of the Invention

According to the embodiments of the present invention, in the channel transmission system where the transmission scheme is sequentially modified depending on the characteristics of a logical channel in the case of transmission of multiple functional channels (logical channels) in a common radio physical channel, the CCCH for use in the course of establishment of the RRC connection can be efficiently transmitted in the radio physical channel.

LIST OF REFERENCE SYMBOLS

Figure 1:
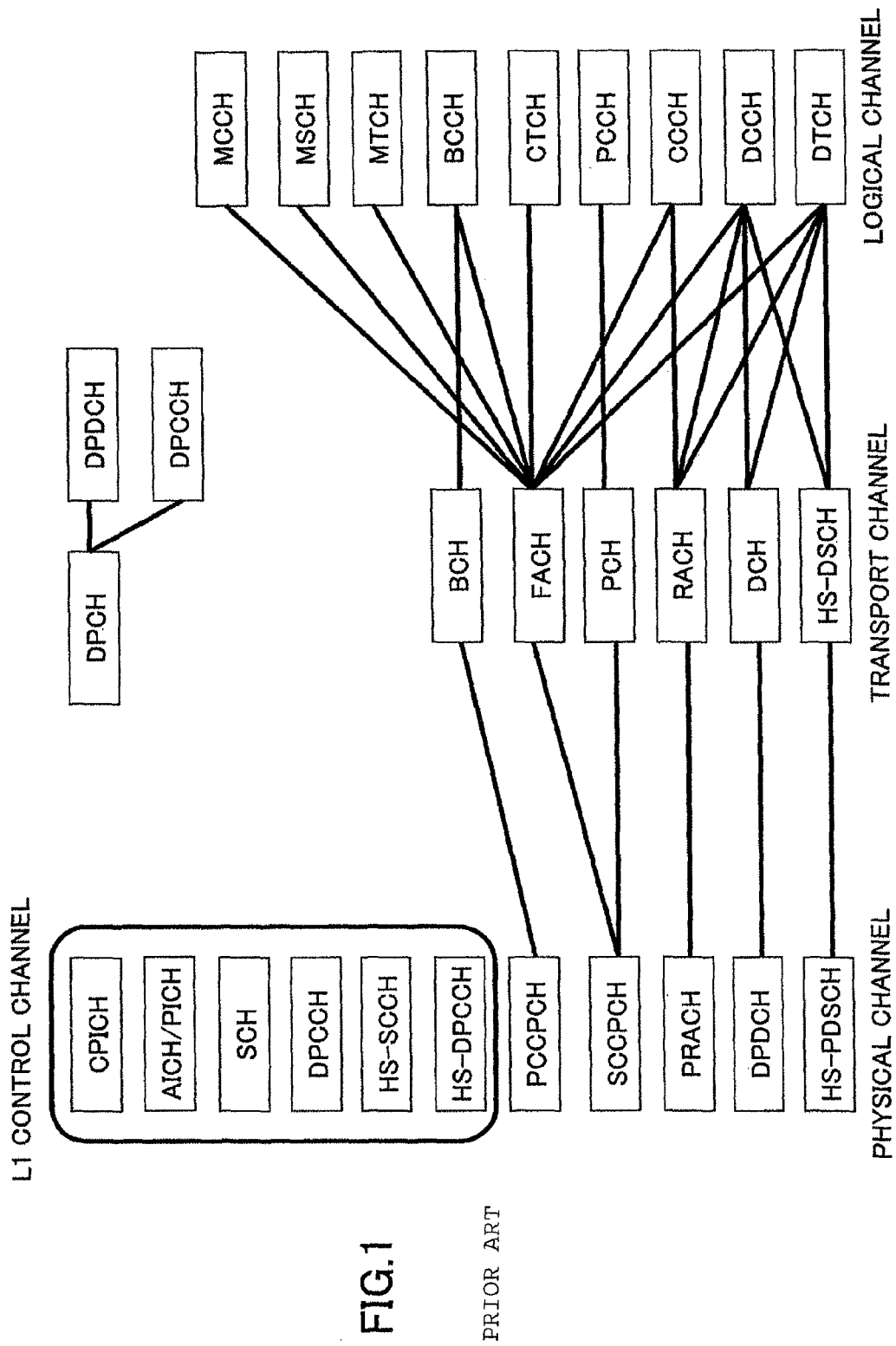
FIG. 1 shows an exemplary correspondence between channels.
Figure 2:
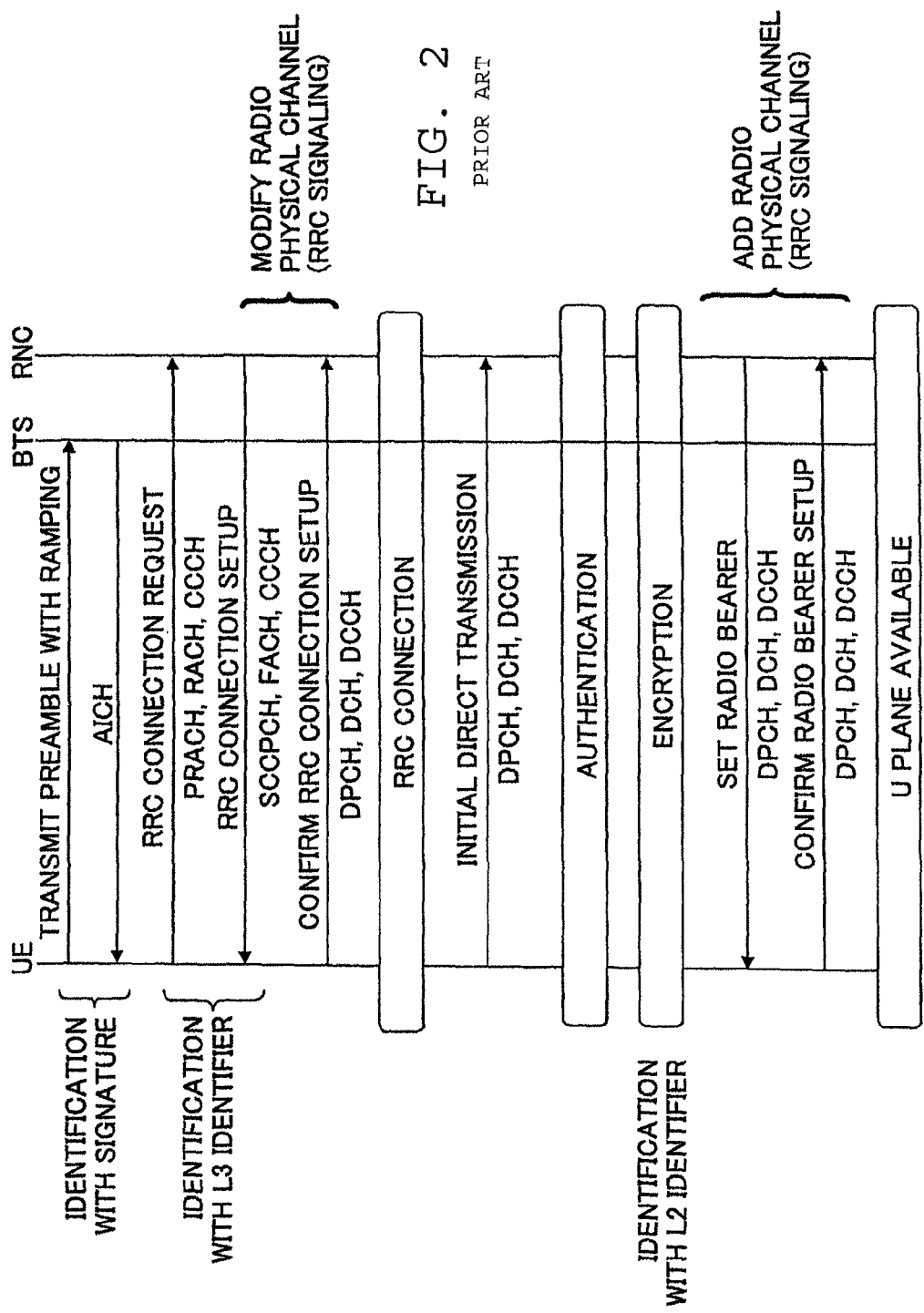
FIG. 2 shows a conventional connection sequence.

UE: user equipment
BTS: base station
RNC: radio network controller

Best Mode for Carrying out the Invention

In one embodiment of the present invention, a radio connection is established between a radio access network (RAN) and user equipment (UE), and multiple logical channels for use in data transmission are transmitted over the radio physical channel. In the logical channels, a logical channel for control and a logical channel for data communication are provided. A radio physical channel available to the logical channels in common is provided. The logical channels only have correspondence with a single radio physical channel, and concomitantly with the radio physical channel, multiple common radio physical control channels are provided for transmission of the logical channels. Depending on the logical channels, the transmission method may be modified over the radio physical control channels. In other words, the identification method of the UE in the radio physical control channel may be modified depending on the type of the logical channel. Conventionally, the UE in the radio physical control channel may be determined only after a dedicated channel has been established in the L2 layer. Thus, the conventional method may significantly differ from the present invention in that the conventional method has only one type of UE identification method in the radio physical control channel.

The radio physical channel is used for at least a logical channel for a common channel and a logical channel for a dedicated channel. The common channel is a channel common to unspecified users, and the dedicated channel is a channel for a certain user. The radio physical channel may be commonly used for a logical channel for a broadcast channel as well as the logical channel for the common channel and the dedicated channel. Also, the radio physical channel may be commonly used for a logical channel for a paging channel as well as the logical channel for the common channel and the dedicated channel. In addition, all logical channels may be transmitted over one type of radio physical channel (shared channel).

In one embodiment of the present invention, the transmission method (UE identification method) may be modified over a commonly used physical control channel concomitantly with a shared channel depending on the type of the logical channel (CCCH), and thus a connection sequence from signaling to transmission of U-plane data can be implemented over the same radio physical channel. Since the multiple logical channels are arranged in a single radio physical channel, the channel configuration can be simplified. In addition, since multiple protocol statuses do not have to be defined, reduction in test operation and omission of channel transition procedures by L3 signaling can be fulfilled, thereby reducing the message length of the L3 signaling. Also, delay involved in channel transition can be reduced, resulting in reduction in connection delay. In addition, data loss can be avoided.

First Embodiment

An apparatus and a method according to a first embodiment of the present invention will be described below.
<Communication System>

Figure 3:
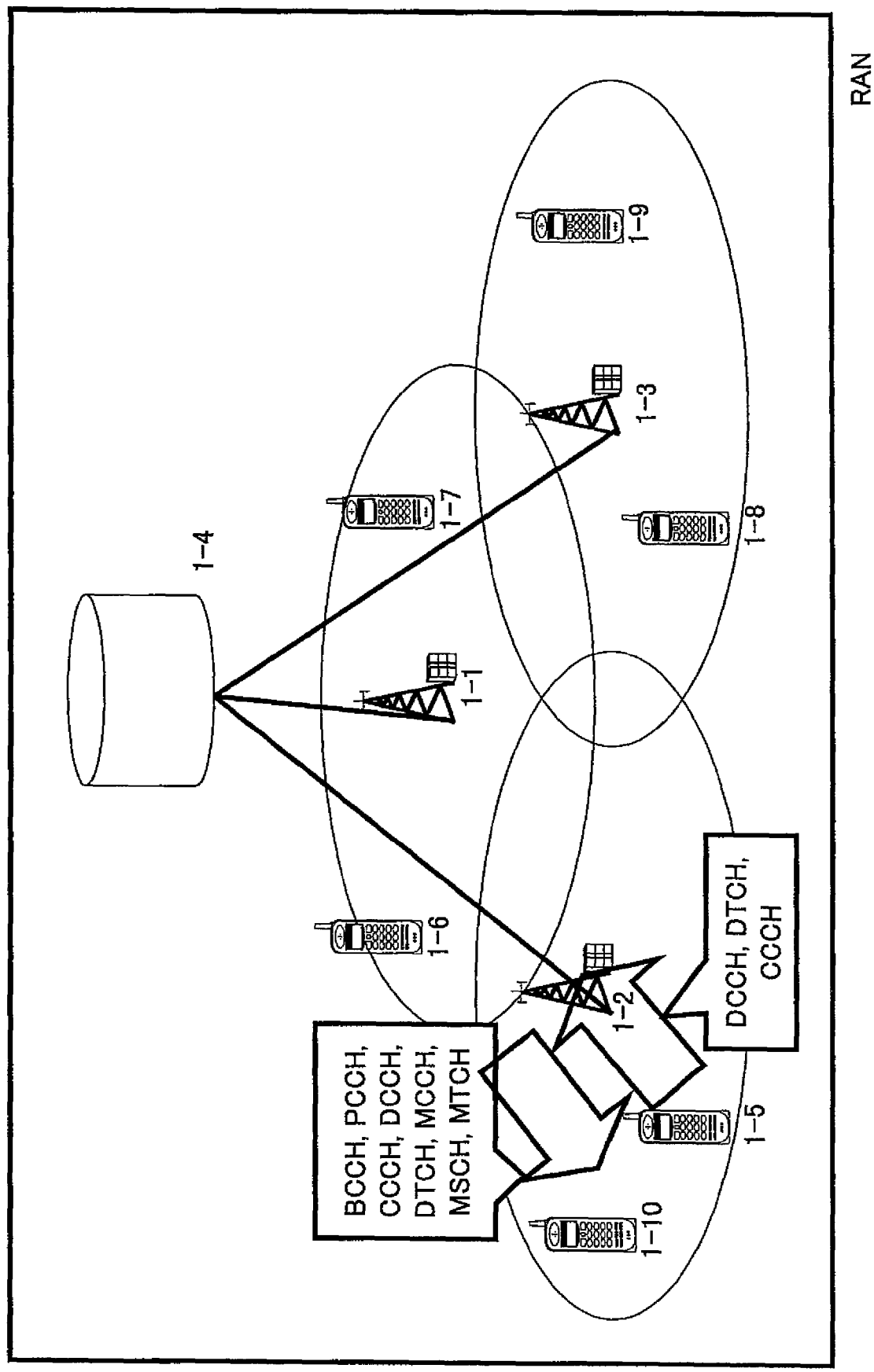
FIG. 3 shows an exemplary communication system.

FIG. 3 shows an exemplary communication system that may be used in this embodiment. The communication system (more specifically, a radio access network) of the embodiment includes multiple transmitters or base stations (BTSs) 1-1, 1-2, 1-3, a radio network controller (RNC) 1-4, and multiple receivers or user equipment sets (UEs) 1-5, 1-6, 1-7, 1-8, 1-9, 1-10. In the communication system, a service is used in the air in order to exchange information between a BTS and the UE.

The BTS has a protocol stack in the physical layer and further includes the MAC layer having a retransmission control function (HARQ). Also, the signaling for the L3 (RRC) layer is terminated between the RNC and the UE. Depending on the configuration of the RAN, no RNC may be provided. In other words, the function possessed by the RNC may be distributed over the BTSs. In this case, the L3 signaling is terminated between the BTS and UE. Between the BTS and UE, a radio physical channel used for multiple UEs in common may be defined as a radio physical channel for transmissions from the BTS to UE (downlink: DL) and from the UE to BTS (uplink: UL). In this radio physical channel, all logical channels can be transmitted.

According to this embodiment, the transmitter and the receiver are defined as the BTS and the UE, respectively, for transmitting information via a radio link. However, the transmission path between the transmitter and the receiver is not limited to the radio link and may be a wired transmission path.
<Correspondence Between a Functional Channel and a Physical Channel>

Figure 4:
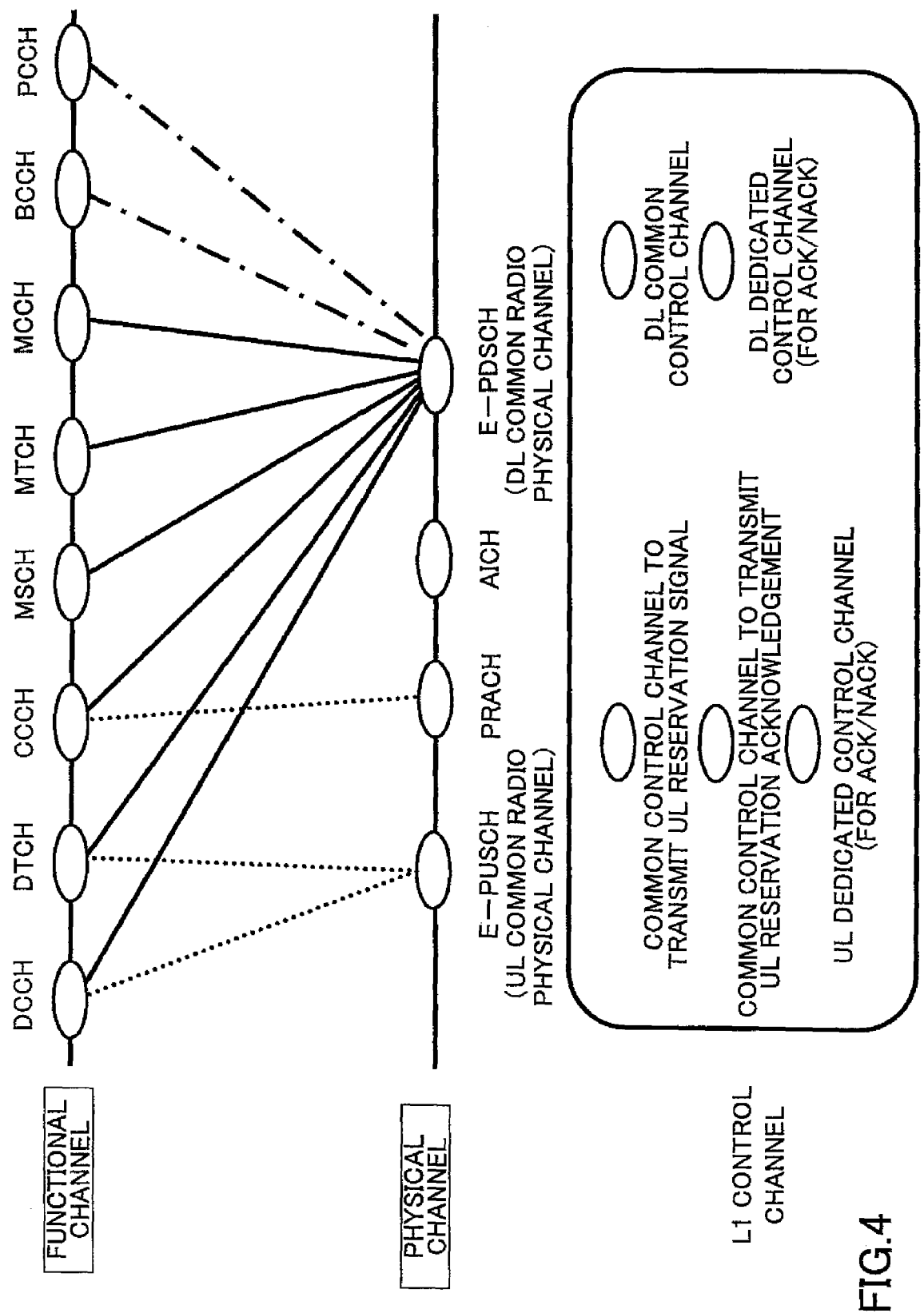
FIG. 4 shows an exemplary correspondence between channels according to one embodiment of the present invention.

Exemplary correspondence between a logical channel and a physical channel that may be used in this embodiment will be described by using a logical channel and a radio physical channel provided for W-CDMA with reference to FIG. 4. The logical channel comprises BCCH, PCCH, MCCH, DCCH, CCCH, DTCH, MSCH and MTCH. Particularly, CCCH and DCCH are focused on in this embodiment. On the other hand, one commonly usable radio physical channel is provided for each of the uplink and the downlink (PDSCH and PUSCH). In addition, PRACH is provided in UL. In the DL radio physical channel (PDSCH), BCCH, PCCH, MCCH, DCCH, CCCH, MSCH, MTCH and DTCH can be transmitted. In the UL radio physical channel (PUSCH), DCCH and DTCH can be transmitted. In PRACH, CCCH can be transmitted.

Meanwhile, in addition to the common radio physical channel for use in data transmission in DL and UL, the radio physical channel may concomitantly include a radio physical control channel for controlling the common radio physical channel. Although only the radio physical control channel concomitant with the common radio physical channel is illustrated, several other radio physical control channels such as a common pilot channel and a synchronization channel may be provided. Concomitantly with the UL common radio physical channel (PUSCH), a reservation signal transmission channel, a reservation acknowledgement signal transmission channel and an indicator channel may be provided. The reservation signal transmission channel serves as a common channel for transmitting a reservation signal at the occurrence of data in the UL. The reservation signal transmission channel is conventionally set after establishment of a RRC connection. In this embodiment, however, it may be set at the L3 identification stage. The reservation acknowledgement signal transmission channel serves as a common channel for transmitting a reservation acknowledgement to the UE for replying to the reservation signal transmission channel. The reservation acknowledgement signal transmission channel is conventionally set after the establishment of the RRC connection. In this embodiment, however, it may be set at the L3 identification stage. The indicator channel serves as a channel for reporting ACK/NACK to the transmitting side in the case where retransmission involved in HARQ is controlled in data transmission in the UL. The indicator channel is set after the establishment of the RRC connection.

Similarly, concomitantly with the DL common radio physical channel (PDSCH), a common radio physical control channel and an indicator channel are provided. The common radio physical control channel serves as a channel for reporting to the receiving side in advance that data will be transmitted in the common radio physical channel. The common radio physical control channel is conventionally set after the establishment of the RRC connection. In this embodiment, however, it may be set at the L3 identification stage. The indicator channel serves as a channel for reporting ACK/NACK (or CQI (Channel Quality Indicator)) to the transmitting side in the case where retransmission involved in HARQ is controlled in data transmission in the DL. It may be set after the establishment of the RRC connection.

For simplicity of explanation, the correspondence between a logical channel and a radio physical channel is focused on in this embodiment, and a description of a transport channel defined in W-CDMA may be omitted. Some type of transport channel may be defined between the logical channel and the physical channel.
<Connection Sequence>

Figure 5:
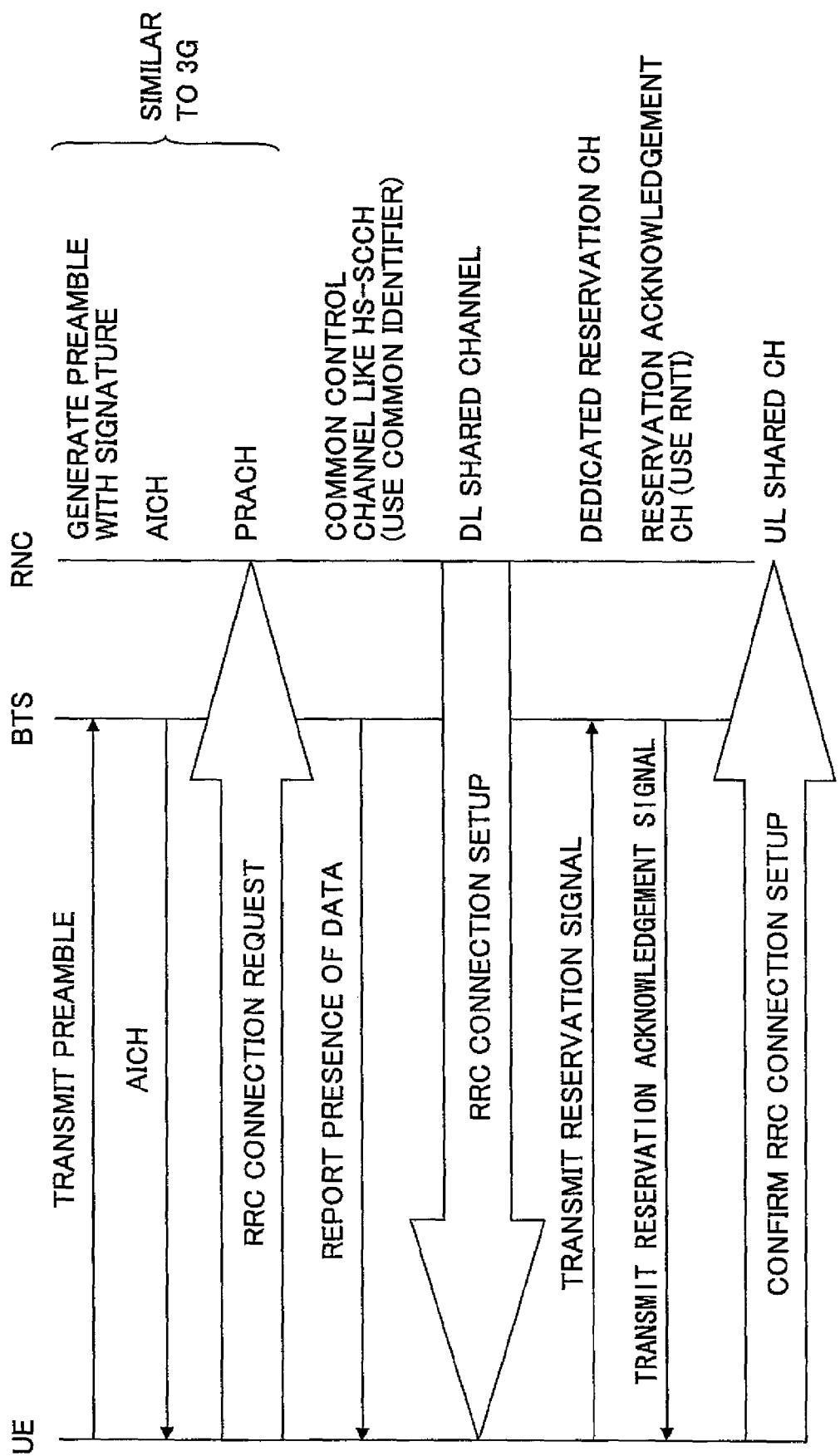
FIG. 5 shows an exemplary connection sequence according to one embodiment of the present invention.

FIG. 5 shows an exemplary connection sequence according to this embodiment. In this embodiment, a sequence before the RRC connection is established will be focused on. In order to transmit a "RRC connection request" to the RNC, the UE transmits a preamble for reserving a radio physical channel between the BTS and the UE to the BTS. The preamble includes a signature selected by the UE randomly. Upon receiving the preamble, BTS transmits acknowledgement or grant over AICH. Upon receiving the acknowledgement over the AICH, the UE transmits a "RRC connection request" in an uplink radio physical channel (PRACH) at a timing (such as time and/or frequency) predefined by the system. When the "RRC connection request" arrives at the BTS, it is forwarded to the RNC. Upon receiving the "RRC connection request", the RNC transmits a "RRC connection setup". In order to transmit the received "RRC connection setup" to the RNC, the BTS transmits a data arrival notification in a common radio control channel corresponding to the HS-SCCH. (After establishment of the RRC connection, data arrival in the downlink radio physical channel (PDSCH) is reported in the same channel.) The data arrival notification includes a global identifier (assigned for the CCCH among the RNTIs in advance). The global identifier is an identifier commonly used by multiple UEs that are communicating with a logical channel of CCCH and may be referred to as "a common identifier". In addition, the BTS transmits the "RRC connection setup" in a downlink common radio physical channel at a timing specified in the data arrival notification. The UE receiving the data arrival notification receives the "RRC connection setup" at a timing specified in the arrival notification. After the UE has received the "RRC connection setup", the RRC connection is established, and the UE adds a radio physical channel specified in the RRC connection setup. (Also, the UE adds a dedicated control channel for uplink transmission of a reservation signal, an ACK/NACK channel for HARQ and a downlink radio channel.) Then, a reservation signal is transmitted to the BTS in the dedicated control channel. A reservation acknowledgement is transmitted in a reservation acknowledgement channel similar to the channel prior to the establishment of the RRC connection.

<Architecture of RNC>

Figure 6:
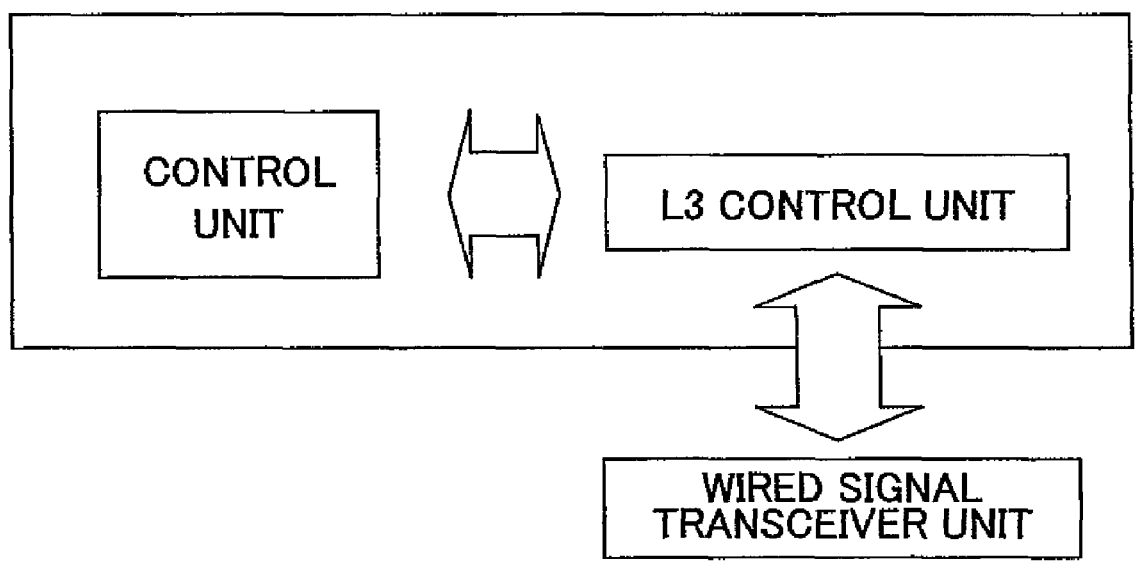
FIG. 6 is a functional block diagram illustrating an exemplary RNC according to one embodiment of the present invention.

FIG. 6 is a block diagram illustrating functions of the RNC according to this embodiment. As illustrated in FIG. 6, the RNC includes a control unit, a wired signal transceiver unit and a L3 control unit. The control unit controls functional entities to manage the overall operation of RNC. The wired signal transceiver unit serves to transmit and receive signals between the BTS and RNC. The L3 control unit serves to perform L3 signaling between the UE and RNC.

<Architecture of BTS>

Figure 7:
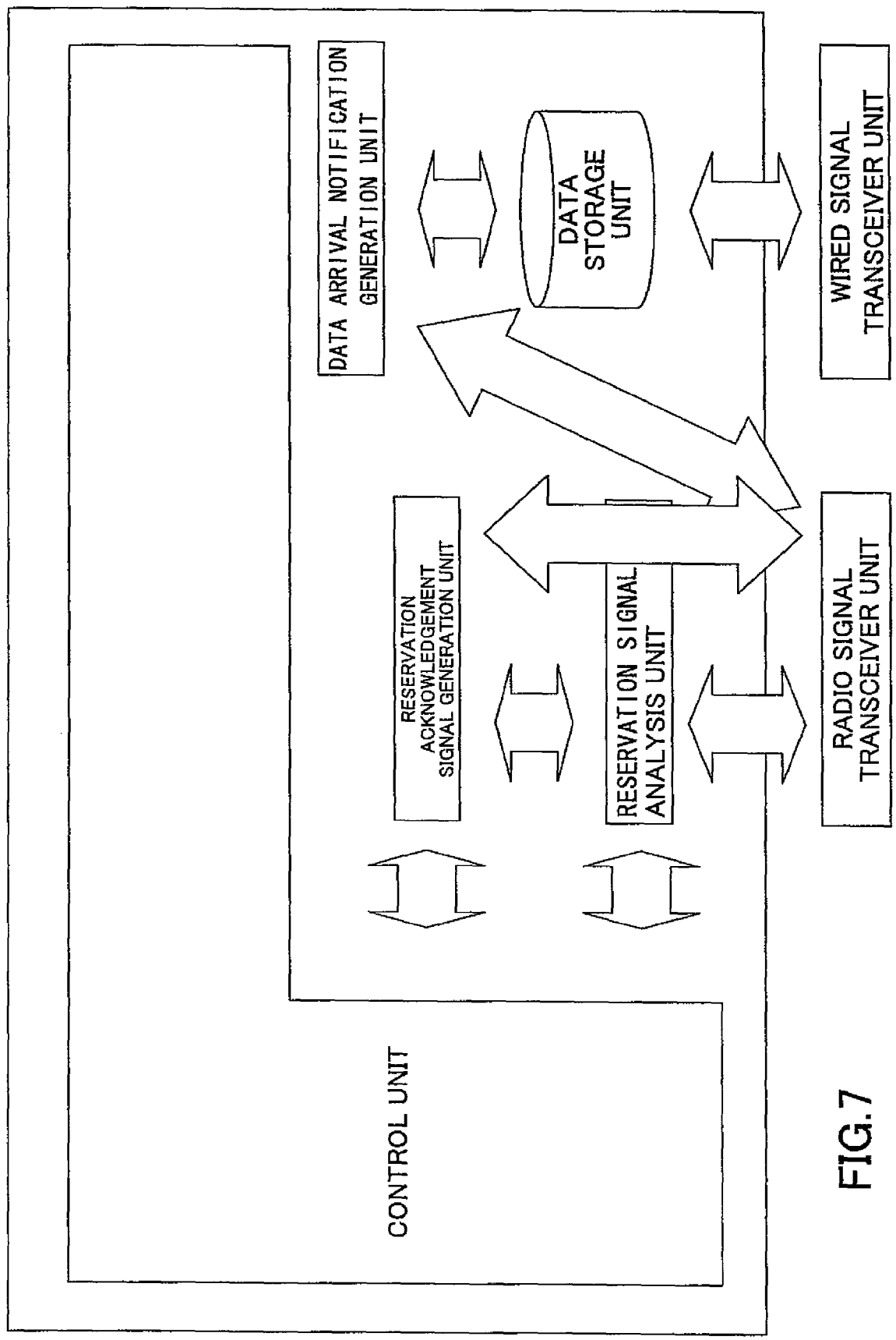
FIG. 7 is a functional block diagram illustrating an exemplary BTS according to one embodiment of the present invention.

FIG. 7 is a block diagram illustrating functions of the BTS according to this embodiment. The BTS includes a control unit, a radio signal transceiver unit, a wired signal transceiver unit, a reservation signal analysis unit, a reservation acknowledgement signal generation unit, a data arrival notification generation unit and a data storage unit.

The control unit controls functional entities to manage the overall operation of the BTS. The radio signal transceiver unit serves to perform operations (radio modulation and channel encoding, etc.) required to exchange signals via a radio link established between the UE and BTS. The wired signal transceiver unit serves to perform operations required to transmit signals in a wired line between the RNC (upper node) and BTS. The reservation signal analysis unit has two functions, that is, the function of analyzing a preamble and the function of analyzing a reservation signal transmitted in a reservation channel after the establishment of the RRC connection. The reservation acknowledgement signal generation unit also has two functions, that is, the function of responding to the preamble and the function of generating a reservation acknowledgement of a response to a reservation signal transmitted in a reservation channel. The data arrival notification generation unit serves to generate a signal to report data arrival in order to transmit a relevant signal in a downlink radio physical channel if the wired signal transceiver unit receives a signal from the RNC (upper node). In addition, the data arrival notification generation unit serves to set an identifier depending on the type of the data (the type of the logical channel). The data storage unit serves to store a relevant signal until the wired signal transceiver unit can forward the signal transmitted from the RNC (upper node) in the downlink radio physical channel.

<Architecture of UE>

Figure 8:
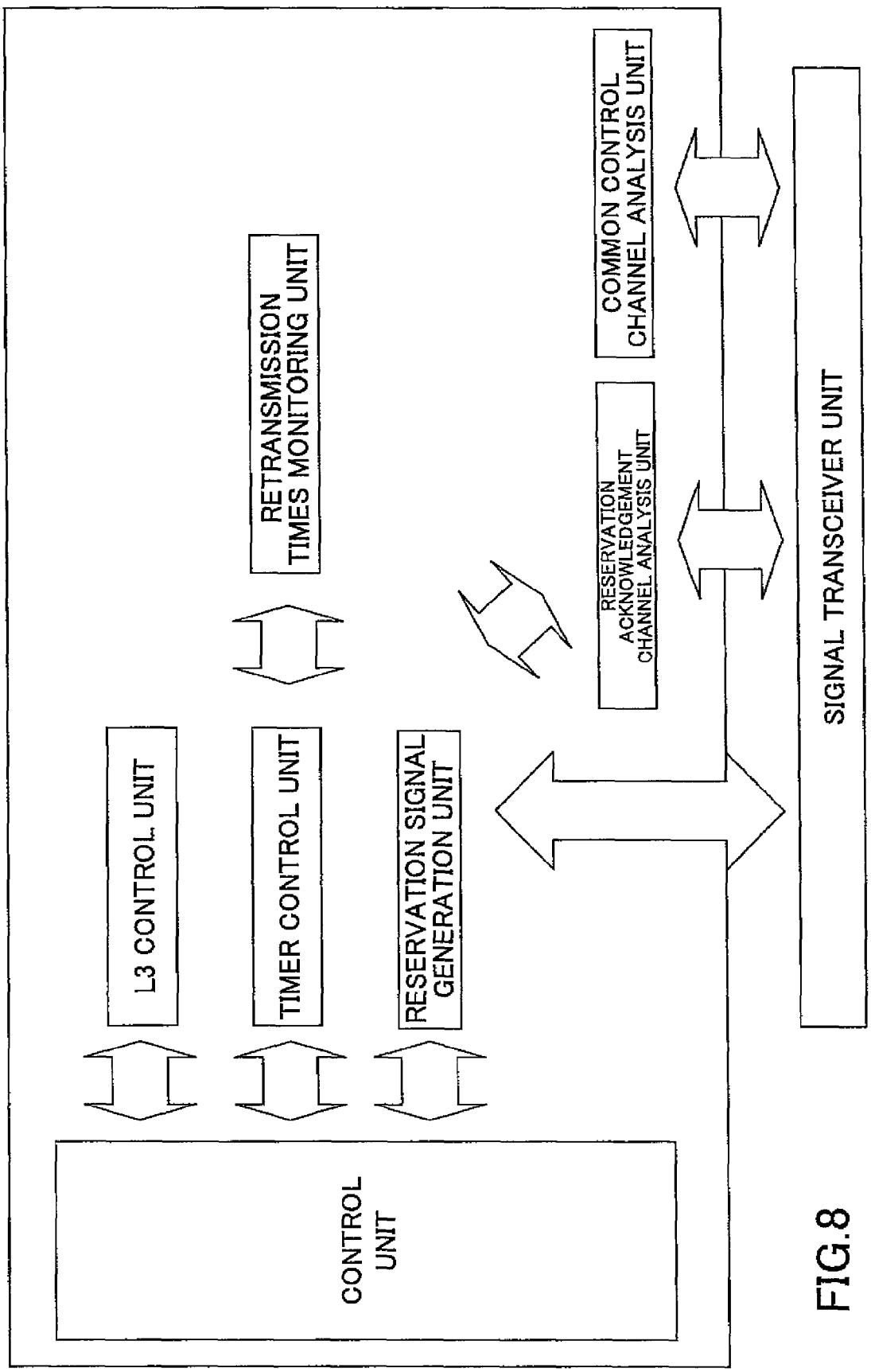
FIG. 8 is a functional block diagram illustrating exemplary UE according to one embodiment of the present invention.

FIG. 8 is a block diagram illustrating functions of the UE according to this embodiment. The UE includes a control unit, a signal transceiver unit, a reservation signal generation unit, a retransmission times monitoring unit, a timer control unit, a reservation acknowledgement channel analysis unit, a L3 control unit and a common control channel analysis unit. The control unit controls functional entities and manages the overall operation of the UE. The signal transceiver unit serves to perform operations on a radio layer such as channel encoding, radio modulation and synchronization establishment in order to transmit a control signal and user data between the UE and RAN (BTS, RNC). In addition, the signal transceiver unit serves to transmit and receive a signal at a timing specified in a reservation acknowledgement channel or a common control channel. The reservation signal generation unit serves to generate a reservation signal for reserving transmission to the BTS in the uplink reservation type access. In addition, the reservation signal generation unit serves to generate a preamble when data occur or when a connection sequence starts upon calling. The retransmission times monitoring unit serves to monitor the number of retransmissions of a preamble. The timer control unit monitors while grant is being waited for in the AICH after transmission of the preamble. The reservation acknowledgement channel analysis unit serves to recognize that the grant for the preamble in the initial stage of the connection sequence (prior to the establishment of the RRC connection) is transmitted. In addition, the reservation acknowledgement channel analysis unit serves to analyze transmission acknowledgement timing (such as time and frequency) in the reservation acknowledgement signal transmitted in the reservation acknowledgement channel after the establishment of the RRC connection. The L3 control unit serves to transmit and receive a L3 (RRC) control signal in the connection sequence and analyze the L3 control signal. The common control channel analysis unit serves to analyze transmission timing of data in the downlink radio physical channel. In addition, since a signal in a common control channel is masked by a global identifier before the establishment of the RRC connection, the common control channel analysis unit serves to recognize the relevant identifier.

<Operations Flow of RNC (Establishment of RRC Connection)>

Figure 9:
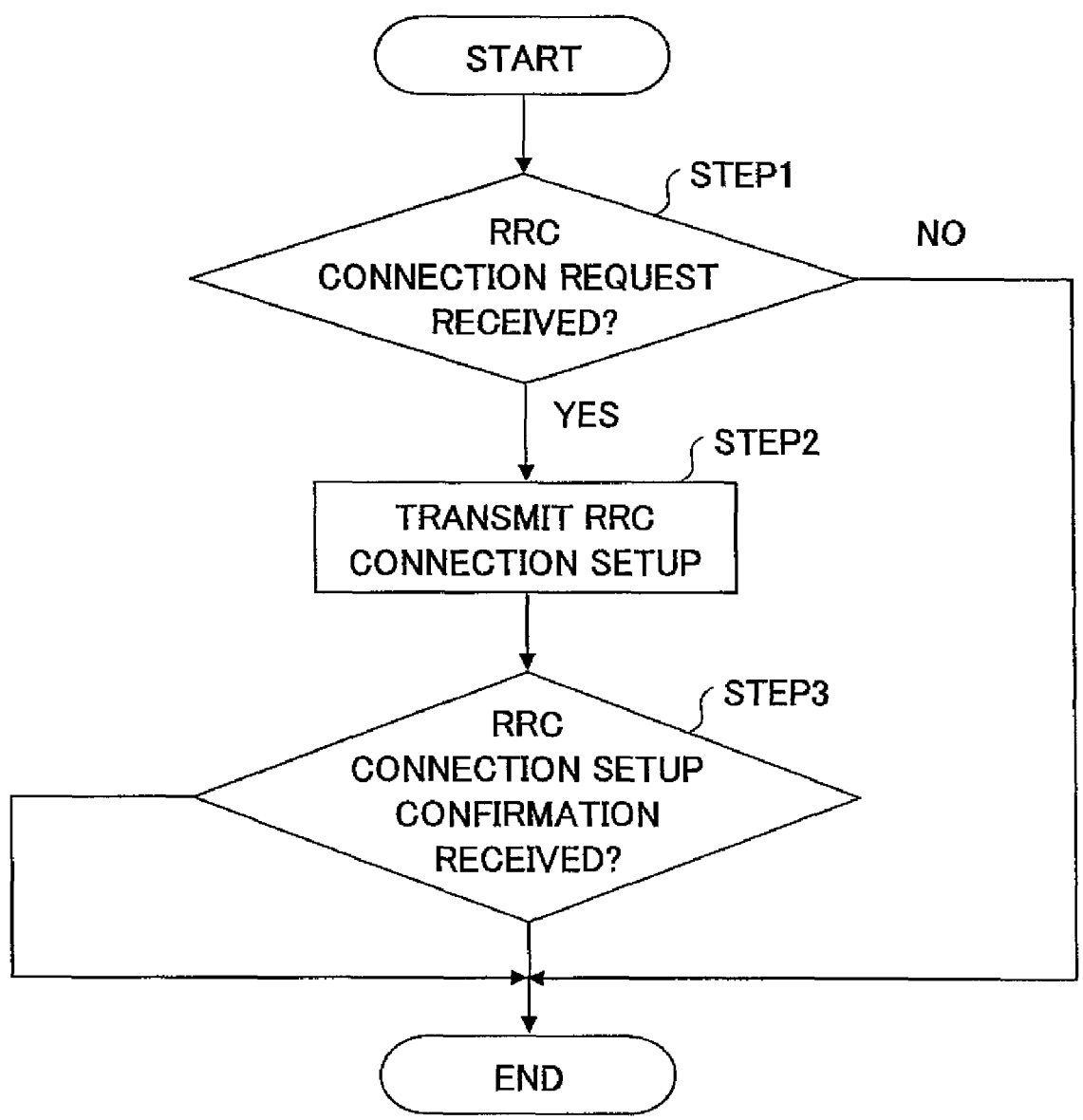
FIG. 9 is a flowchart illustrating an exemplary RNC operation according to one embodiment of the present invention.

FIG. 9 shows an exemplary operations flow of the RNC according to this embodiment. In this embodiment, a connection sequence before the RRC connection is established will be focused on. At step 1, the RNC determines whether it has received a "RRC connection request" from the BTS. If RNC determines at step S1 that it has received the "RRC connection request", the RNC transmits a "RRC connection setup" to the BTS at step 2. After the transmission of the "RRC connection setup", the RNC determines whether it has received an "RRC connection setup confirmation" at step 3. If the RNC determines that it has received the "RRC connection setup confirmation" at step 3, the RNC makes ready to receive the next incoming "RRC connection request". On the other hand, if the RNC determines that it has not received the "RRC connection request" at step 1, the RNC terminates the process. If the RNC determines that it has not received the "RRC connection setup confirmation" at step 3, the RNC terminates the process.

<Operations Flow of BTS>

Figure 10:
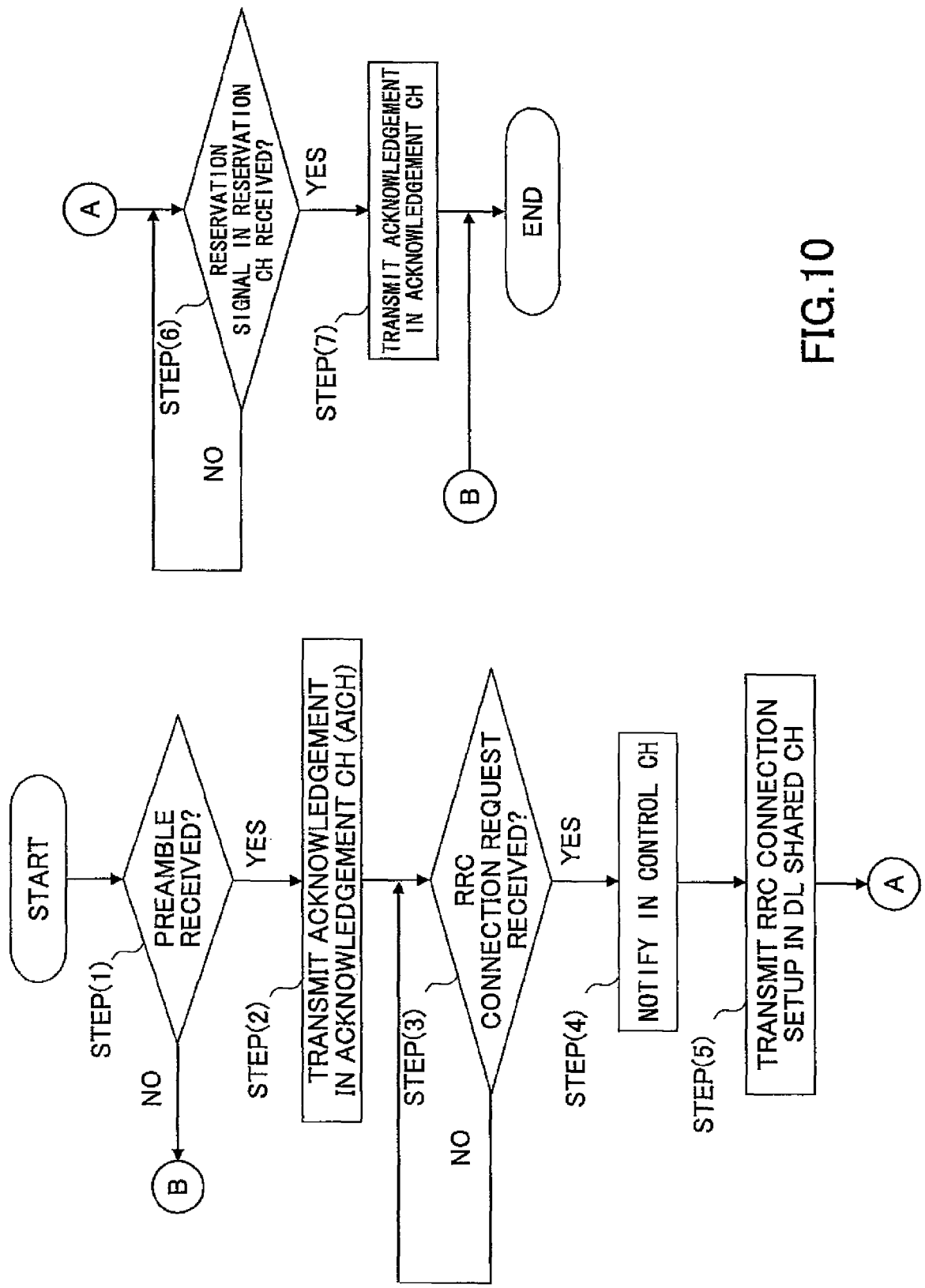
FIG. 10 is a flowchart illustrating an exemplary BTS operation according to one embodiment of the present invention.

FIG. 10 shows an exemplary operations flow of the BTS according to this embodiment. At step 1, the BTS determines whether it has received a preamble from the UE. If the BTS determines that it has received the preamble at step 1, the BTS uses a signature in the preamble to generate a grant signal and transmits it in the AICH at step 2. At step 3, the BTS determines whether it has received a "RRC connection request" from the UE. If the BTS determines at step 3 that it has received the "RRC connection request", the BTS transmits the received "RRC connection request" to the RNC. When the BTS receives a "RRC connection setup" as a response to the "RRC connection request" from the RNC, the BTS transmits the "RRC connection setup". This transmission is carried out with a global identifier in a common control channel. At step 5, the BTS transmits a "RRC connection setup" message in a downlink common radio physical channel at a specified timing. At step 6, the BTS determines whether a reservation signal is being transmitted in a reservation channel established between the BTS and the UE. If the BTS determines at step 6 that the reservation signal is being transmitted in the reservation channel, the BTS transmits a reservation acknowledgement signal in a reservation acknowledgement channel at step 7. Subsequently, the steps 6 and 7 are repeated. On the other hand, if it is determined at step 1 that the preamble has not been transmitted, the BTS terminates the process. If it is determined at step 3 that the BTS has not received the "RRC connection request", the BTS waits for the "RRC connection request" at step 3. If it is determined at step 6 that the reservation signal has not been transmitted, the BTS waits for the reservation signal at step 6.

<Operations Flow of UE>

Figure 11:
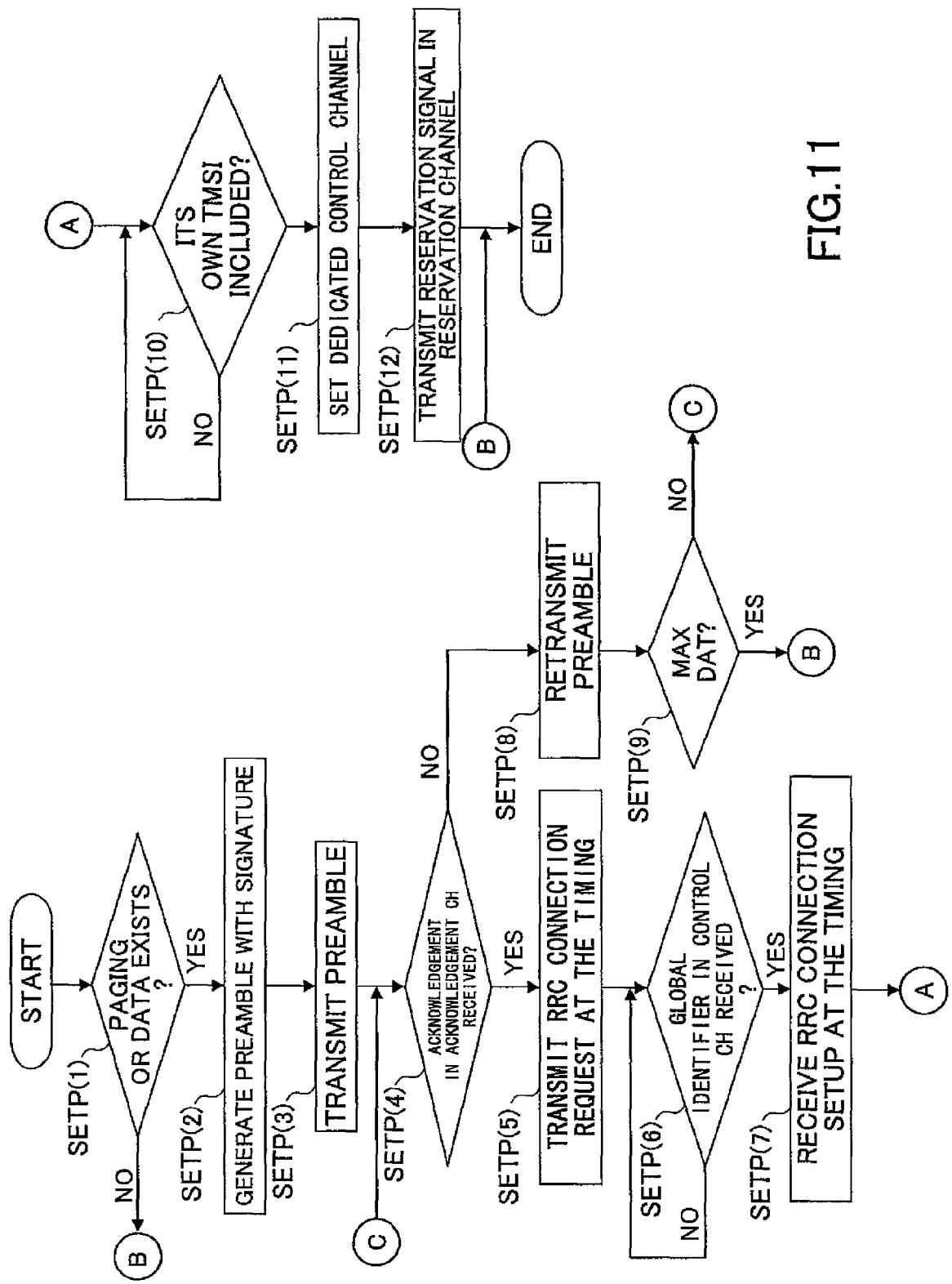
FIG. 11 is a flowchart illustrating an exemplary UE operation according to one embodiment of the present invention.

FIG. 11 shows an exemplary operations flow of the UE according to this embodiment. At step 1, the UE determines whether paging from the RAN exists or whether data to be transmitted occur in the UE. If the UE determines at step 1 that the paging exists or the data to be transmitted occur, the UE proceeds to establish a RRC connection. Then, the UE generates a preamble to transmit an uplink signal to the BTS. This preamble is generated to include a signature at step 2. At step 3, the UE transmits the generated preamble. At step 4, the UE determines whether a grant signal configured from the signature is transmitted in the AICH transmitted from the BTS. If it is determined at step 4 that the grant signal including UE's signature is transmitted in the AICH, the UE transmits a L3 control signal to establish a RRC connection as a "RRC connection request" to the BTS at a timing (together with frequency, the modulation scheme and others) predefined in the system at step 5. At step 6, it is determined whether a data arrival notification masked by a global identifier is transmitted in a common control channel after the transmission of the "RRC connection request" at step 5. If it is determined at step 6 that the data arrival notification is transmitted in the common control channel, the UE analyzes the data arrival notification and receives data (RRC connection setup) transmitted in a DL radio physical channel based on instructions (modulation scheme, channel encoding, frequency, transmission timing and others) in the data arrival notification at step 7. At step 10, the UE determines whether the UE's TMSI is included in the "RRC connection setup" received in a DL radio physical channel. If it is determined at step 10 that the TMSI is included, the UE sets a dedicated radio physical channel (for controlling) based on radio physical channel information in the "RRC connection setup" at step 11. At step 12, a reservation signal for subsequent transmission and reception of user data and the L3 control signal is transmitted in a commonly set channel for the transmission of the reservation signal.

On the other hand, if it is determined at step 1 that the paging from RAN does not exist and that no data to be transmitted exist, UE terminates the process. Also, if it is determined at step 4 that the grant signal has not been received in the AICH, the preamble is retransmitted after the lapse of a predefined time duration at step 8. After the retransmission of the preamble, at step 9, the UE determines whether the number of retransmissions reaches a predefined number of times. If it is determined at step 9 that the retransmission times does not reach the predefined number of times, the control returns to step 4. On the other hand, if it is determined at step 9 that the number of retransmission times reaches the predefined number of times, the UE terminates the process. If it is determined at step 6 that UE has not received the data arrival notification masked by the global identifier in the common control channel, the UE waits for the data arrival notification at step 6. Also, if it is determined at step 10 that the received data do not include the UE's TMSI, the UE waits for the data including the UE's TMSI.

Second Embodiment

An apparatus and a method according to a second embodiment of the present invention will be described below.

Figure 12:
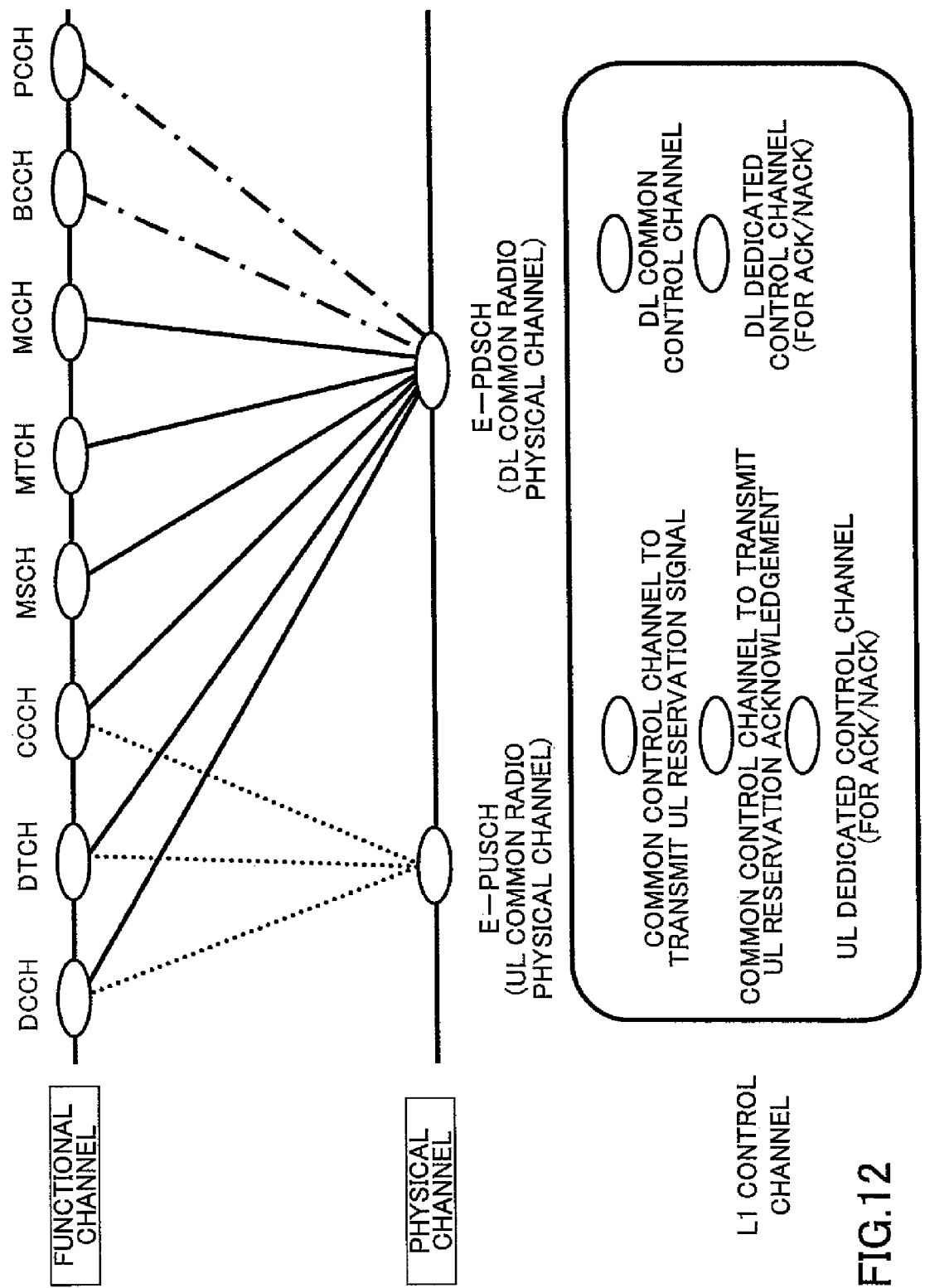
FIG. 12 shows an exemplary correspondence between channels according to one embodiment of the present invention.

A communication system according to this embodiment is the same as the communication system according to the first embodiment, and thus duplicated descriptions thereof will be omitted. Although the correspondence between a functional channel and a physical channel according to this embodiment is almost the same as the correspondence between a functional channel and a physical channel according to the first embodiment, they differ from each other in that the CCCH is also transmitted in the E-PUSCH in an uplink radio channel as illustrated in FIG. 12. In other words, while only one common channel is used in a downlink line according to the first embodiment, only one common channel is used in an uplink line and only one common channel is used in a downlink line according to the second embodiment.

<Connection Sequence>

Figure 13:
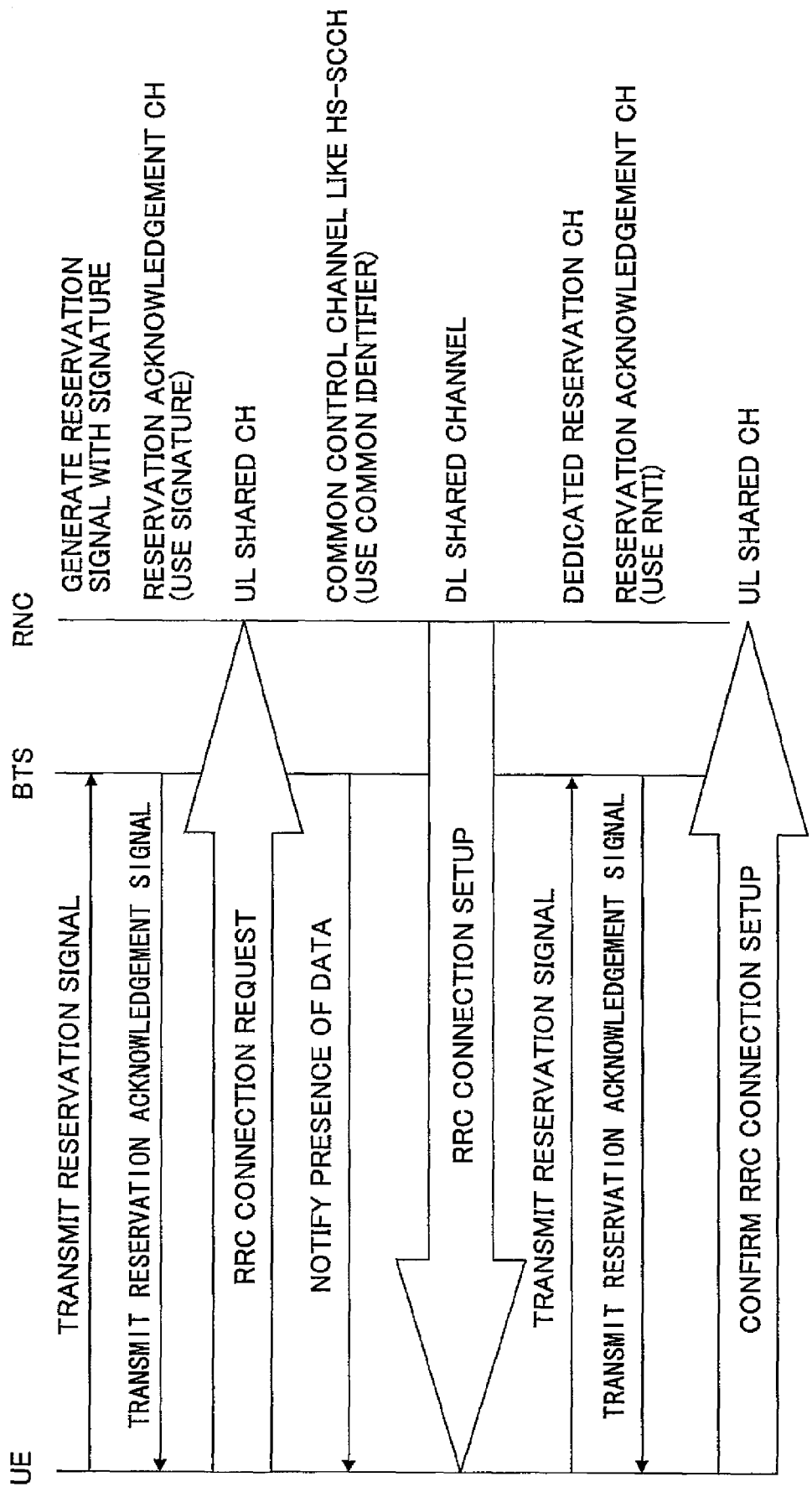
FIG. 13 shows an exemplary connection sequence according to one embodiment of the present invention.

An exemplary connection sequence according to this embodiment will be described below with reference to FIG. 13. Also in this embodiment, a sequence before a RRC connection is established will be focused on. In order to transmit a "RRC connection request" to the RNC, the UE transmits a reservation signal for reserving a radio physical channel between the UE and the BTS to the BTS. The reservation signal is configured to include a signature selected by the UE randomly (or other methods) The signature may be configured similar to the W-CDMA scheme. Alternatively, a portion of a L2 identifier (RNTI) may be assigned to the signature. The BTS receiving the reservation signal transmits a reservation acknowledgement (configured to include the signature) in a reservation acknowledgement channel. The reservation acknowledgement channel may be used as a channel for transmitting the reservation acknowledgement continuously after the establishment of the RRC connection. When the UE receives the reservation acknowledgement in the reservation acknowledgement channel, the UE transmits a "RRC connection request" in an uplink common radio physical channel (E-PUSCH) at a timing (such as time and frequency) specified in the reservation acknowledgement. When the "RRC connection request" arrives at the BTS, it is further forwarded to the RNC. Upon receiving the "RRC connection request", the RNC transmits a "RRC connection setup". In order to transmit the "RRC connection setup" arriving there, the BTS transmits a data arrival notification in a common radio control channel corresponding to the HS-SCCH. Also after the establishment of the RRC connection, the data arrival in a downlink radio physical channel (PDSCH) is reported in the same channel. The data arrival notification is configured to include a global identifier (assigned to the CCCH among the RNTIs in advance). In addition, the BTS transmits the "RRC connection setup" in the downlink common radio physical channel at a timing specified in the data arrival notification. Upon receiving the data arrival notification, the UE receives the "RRC connection setup" at the timing specified in the arrival notification. When the UE receives the "RRC connection setup", a RRC connection is established, and the UE adds a radio physical channel specified in the RRC connection setup. (Also, the UE may add a dedicated control channel for the uplink transmission of the reservation signal, an ACK/NACK channel for HARQ add a downlink radio channel.) Subsequently, the dedicated control channel is used to transmit the reservation signal to the BTS. The reservation acknowledgement is transmitted in a reservation acknowledgement channel similar to the channel prior to the establishment of the RRC connection.

<Architecture of RNC>

The architecture of the RNC according to this embodiment is the same as the architecture of the RNC (FIG. 6) described in conjunction with the first embodiment, and duplicated descriptions thereof will be omitted.

<Architecture of BTS>

The architecture of the BTS according to this embodiment is the same as the architecture of the BTS (FIG. 7) described in conjunction with the first embodiment. In this embodiment, however, the reservation signal analysis unit of the BTS serves to analyze a reservation signal transmitted from the UE. The reservation acknowledgement signal generation unit of the BTS serves to transmit the reservation acknowledgement to transmit a reservation acknowledgement notification for the reservation signal transmitted from the UE.

<Architecture of UE>

The architecture of the UE according to this embodiment is the same as the architecture of the UE (FIG. 8) described in conjunction with the first embodiment. In this embodiment, however, the reservation signal generation unit of the UE serves to generate a reservation signal. The reservation signal is for obtaining assignment acknowledgement in an uplink radio channel (PUSCH) to transmit a "RRC connection request" and is additionally for obtaining assignment acknowledgement of an uplink radio channel after the establishment of the RRC connection. The reservation acknowledgement channel analysis unit serves to monitor transmission of the reservation acknowledgement transmitted from the BTS to the reservation acknowledgement channel and serves to analyze transmission timing (such as time and frequency) specified in the reservation acknowledgement.

<Operations Flow of RNC (Establishment of RRC Connection)>

The operations flow of the RNC according to this embodiment is the same as the operation flow of the RNC described in FIG. 9, and duplicated descriptions thereof will be omitted.

<Operations Flow of BTS (Establishment of RRC Connection)>

Figure 14:
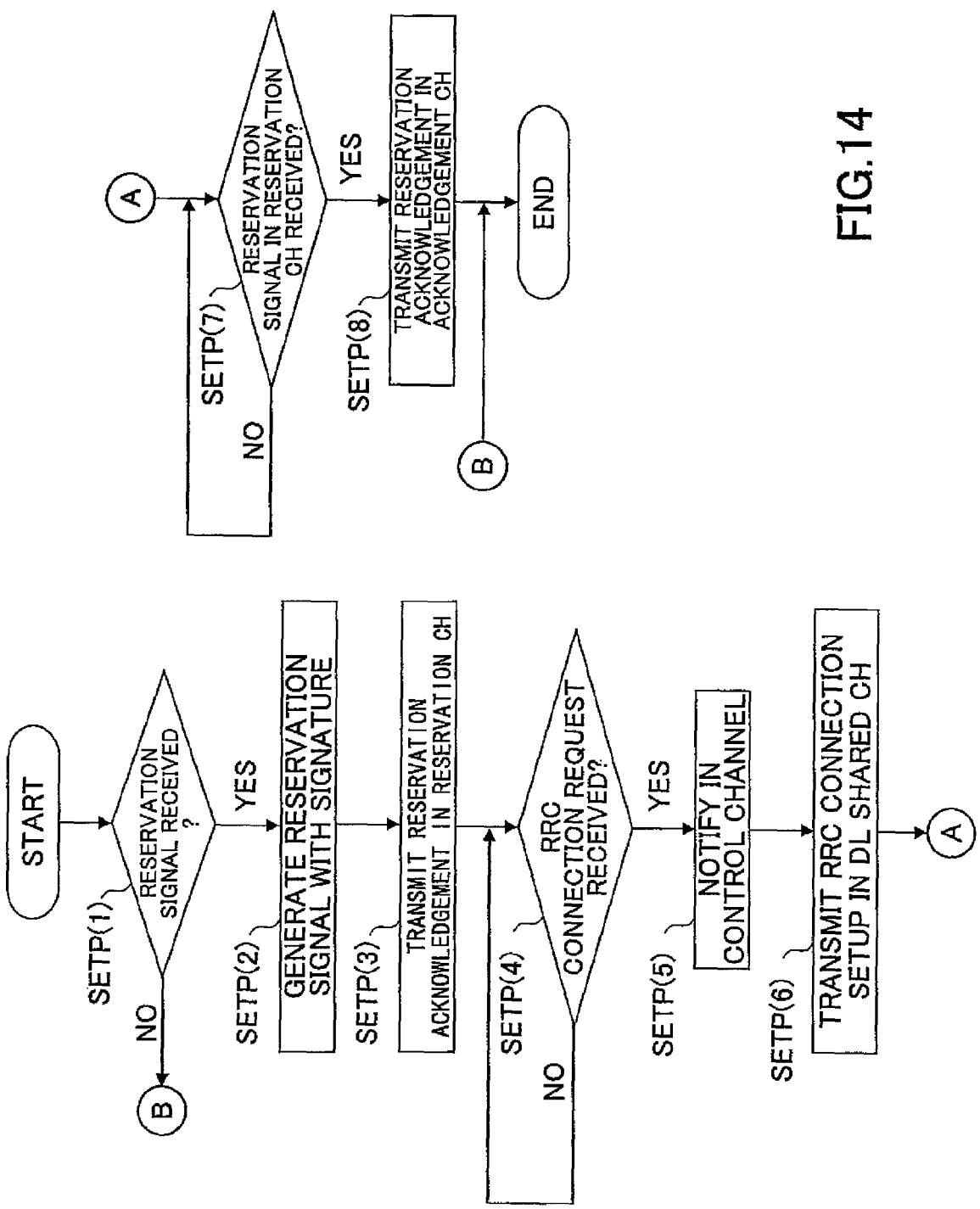
FIG. 14 is a flowchart illustrating an exemplary BTS operation according to one embodiment of the present invention.

An exemplary operations flow according to this embodiment will be described with reference to FIG. 14. In this embodiment, a connection sequence before a RRC connection is established will be particularly described. At step 1, the BTS determines whether it has received a reservation signal from the UE. If it is determined at step 1 that the BTS has received the reservation signal, a signature in the reservation signal is used to generate a reservation acknowledgement signal at step 2. At step 3, the generated reservation acknowledgement signal is transmitted in a reservation acknowledgement channel. At step 4, the BTS determines whether it has received a "RRC connection request" from the UE. If it is determined at step 4 that the "RRC connection request" has been received, the received "RRC connection request" is transmitted to the RNC. At step 5, upon receiving a "RRC connection setup" as a response to the "RRC connection request" from the RNC, the BTS uses a global identifier to report transmitting the "RRC connection setup" in a common control channel. At step 6, the "RRC connection setup" message is transmitted in a downlink common radio physical channel at the reported timing. At step 7, the BTS determines whether the reservation signal is being transmitted in a reservation channel established between the BTS and the UE. If it is determined at step 7 that the reservation signal is transmitted, the reservation acknowledgement signal is transmitted in the reservation acknowledgement channel at step 8. Subsequently, steps 7 and 8 are repeated.

On the other hand, if it is determined at step 1 that the reservation signal has not been transmitted, the BTS terminates the process. If it is determined at step 4 that the "RRC connection request" has not been received, the BTS waits for the "RRC connection request" at step 4. If it is determined at step 7 that the reservation signal has not been transmitted, the BTS waits for the reservation signal at step 7.

<Operations Flow of UE (Establishment of RRC Connection)>

Figure 15:
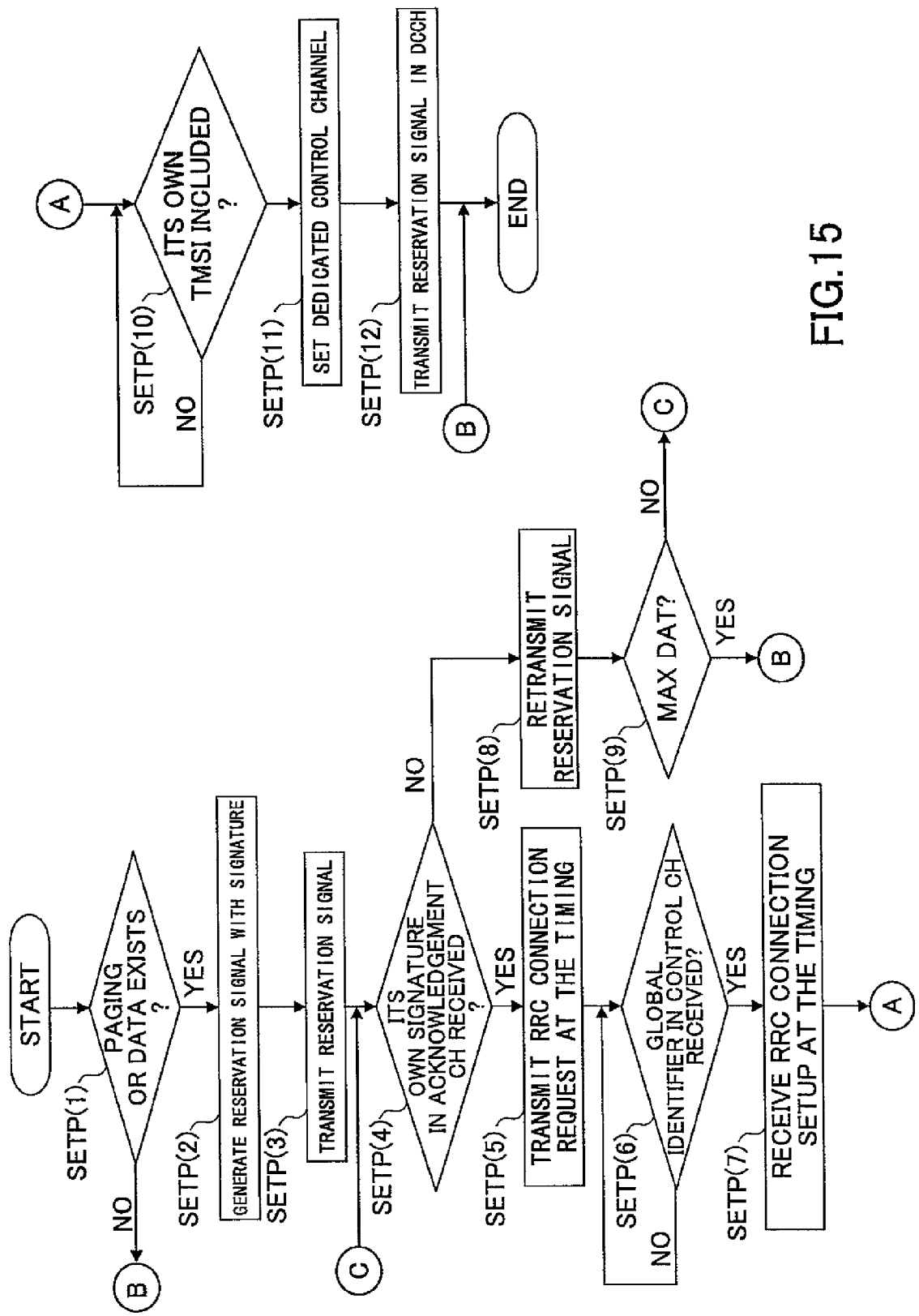
FIG. 15 is a flowchart illustrating an exemplary UE operation according to one embodiment of the present invention.

An exemplary operations flow of the UE according to this embodiment will be described with reference to FIG. 15. Also in this embodiment, a connection sequence before a RRC connection is established will be particularly described. After the establishment of the RRC connection, a dedicated logical channel recognized with the L2 identifier is established between the UE and RAN, and a dedicated control channel is provided for operations such as reservation and transmission and reception of signals.

At step 1, the UE determines whether paging from the RAN exists or whether data to be transmitted occur in the UE. If it is determined at step 1 that the paging exists or the data to be transmitted occur, the UE proceeds to operations for establishing the RRC connection. At step 2, the UE generates a reservation signal to transmit an uplink signal to the BTS. The relevant reservation signal is configured to include a signature selected by the UE randomly. The reservation signal may be configured to generate a spreading sequence by means of the signature. Alternatively, the reservation signal may be configured to include the signature. At step 3, a reservation signal generated at step 2 is transmitted from the UE. At step 4, it is determined whether a reservation acknowledgement signal configured based on the signature selected by the UE itself is being transmitted in a reservation acknowledgement channel transmitted from the BTS. The reservation acknowledgment signal transmitted in the reservation acknowledgement channel may be masked by mean of the signature or configured to include the signature. If it is determined at step 4 that the reservation acknowledgement signal including the signature selected by the UE itself is transmitted in the reservation acknowledgement channel, the reservation acknowledgement signal is analyzed. At step 5, the UE transmits a "RRC connection request" being a L3 control signal for establishing the RRC connection to the BTS at a transmission timing (such as a frequency and modulation scheme) specified in the reservation acknowledgement signal. After the transmission of the "RRC connection request" at step 5, at step 6, it is determined whether a data arrival notification masked by mean of a global identifier is transmitted in a common control channel. If it is determined at step 6 that the data arrival notification is transmitted in the common control channel, the data arrival notification is analyzed, and the UE receives data (RRC connection setup) transmitted in a DL radio physical channel based on instructions (such as modulation scheme, channel encoding, frequency and transmission timing) in the data arrival notification at step 7. At step 10, the UE determines whether the UE's TMSI is included in the "RRC connection setup" received in the DL radio physical channel. If it is determined at step 10 that the UE's TMSI is included, a dedicated radio physical channel (for controlling) is set based on radio physical channel information in the "RRC connection setup" at step 11. Subsequently, the reservation signal to transmit and receive a L3 control signal and user data is transmitted in a commonly set channel for the transmission of the reservation signal at step 12.

On the other hand, if it is determined at step 1 that the paging from RAN and the data to be transmitted do not exist, the process is terminated. Also, if it is determined at step 4 that the reservation acknowledgement signal including UE's signature is received in the reservation acknowledgement channel, the reservation signal is retransmitted after the lapse of a predefined time duration at step 8. At step 9, it is determined after the retransmission of the reservation signal whether the number of retransmissions reaches a predefined number of times at step 9. If it is determined at step 9 that the retransmission times do not reach the predefined times, the control returns to step 4. On the other hand, if the retransmission times reach the predefined times, the process is terminated. If it is determined at step 6 that the data arrival notification masked by means of the global identifier has not been received in the common control channel, the UE waits for the data arrival notification at step 6. Also, if it is determined at step 10 that the received data do not include the UE's TMSI, the UE waits for the UE's TMSI at step 10.

This international patent application is based on Japanese Priority Application No. 2005-178531 filed on Jun. 17, 2005, the entire contents of which are hereby incorporated by reference.

The invention claimed is:

1. A channel transmission apparatus for communicating to a user equipment (UE) within a radio access network (RAN) wherein a radio physical channel is available to multiple logical channels commonly, multiple radio physical control channels are provided concomitantly with the radio physical channel and include a commonly usable common control channel, the apparatus comprising:
   a logical channel type determination unit determining a type of a logical channel; and
   a channel transmission unit transmitting an identifier of the UE in the radio physical control channel depending on the type of the logical channel,
   wherein
      a scheme of identifying the UE in the radio physical control channel is modified depending on the type of the logical channel,
      the identification of the UE is carried out with a common identifier in the common control channel prior to establishment of a radio connection, and
      the common identifier is commonly usable to multiple UEs communicating the common control channel and is assigned to the common control channel in advance.

2. The channel transmission apparatus as claimed in claim 1, further comprising:
   a broadcast unit broadcasting information on the radio control physical channel as broadcast information.

3. The channel transmission apparatus as claimed in claim 1, wherein if the common identifier is detected in the common control channel, data are received in the UE.

4. The channel transmission apparatus as claimed in claim 3, wherein the radio physical control channel comprises a reservation signal transmission channel for transmitting a reservation signal and a reservation acknowledgement channel for transmitting a reservation acknowledgement signal for the reservation signal,
   the apparatus further comprising:
      a channel transmission unit transmitting the reservation acknowledgement signal in the reservation acknowledgement channel,
      wherein the reservation signal is configured to include a signature, and for the UE prior to the establishment of the radio connection, the reservation acknowledgement signal for the reservation signal is transmitted in the reservation acknowledgement channel.

5. The channel transmission apparatus as claimed in claim 4, further comprising:
   a reservation acknowledgement signal analysis unit analyzing the reservation acknowledgement signal transmitted in the reservation acknowledgement channel,
   wherein the identification of the UE is carried out with the signature.

6. The channel transmission apparatus as claimed in claim 5, wherein if the signature is detected in the reservation acknowledgement channel, means for analyzing the reservation acknowledgement signal is provided.

7. A channel transmission method of communicating to a user equipment (UE) within a radio access network (RAN) wherein a radio physical channel is available for multiple logical channels commonly, multiple radio physical control channels are provided concomitantly with the radio physical channel and include a commonly usable common control channel, the method comprising the steps of:
   determining a type of a logical channel;
   transmitting an identifier of the UE in the radio physical control channel depending on the type of the logical channel; and
   modifying a scheme of identifying the UE in the radio physical control channel depending on the type of the logical channel,
   wherein
      the identification of the UE is carried out with a common identifier in the common control channel prior to establishment of a radio connection, and
      the common identifier is commonly usable to multiple UEs communicating the common control channel and is assigned to the common control channel in advance.

* * * * *